(12) United States Patent
Moberg et al.

(10) Patent No.: US 6,460,146 B1
(45) Date of Patent: *Oct. 1, 2002

(54) SYSTEM AND METHOD FOR ESTABLISHING PROCESSOR REDUNDANCY

(75) Inventors: Kenneth Moberg, Boulder Creek, CA (US); William May, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/205,577

(22) Filed: Dec. 4, 1998

(51) Int. Cl.[7] .................................. H02H 3/05
(52) U.S. Cl. ..................... 714/10; 712/20; 709/222
(58) Field of Search ....................... 714/10; 709/222, 709/238; 712/11, 14, 15, 20

(56) References Cited

U.S. PATENT DOCUMENTS

| | | | |
|---|---|---|---|
| 4,823,256 A | * 4/1989 | Bishop et al. ............... 714/10 |
| 5,089,958 A | 2/1992 | Horton et al. .............. 395/575 |
| 5,136,498 A | * 8/1992 | McLaughlin et al. ....... 364/184 |
| 5,157,663 A | * 10/1992 | Major et al. ................. 371/9.1 |
| 5,455,932 A | * 10/1995 | Major et al. ................ 395/489 |
| 5,473,599 A | 12/1995 | Li et al. ....................... 370/16 |
| 5,572,528 A | * 11/1996 | Shuen ........................ 370/402 |
| 5,590,724 A | 1/1997 | Verdgikovsky ............. 175/57 |
| 5,790,777 A | * 8/1998 | Izuta et al. ............. 395/183.21 |
| 5,815,668 A | 9/1998 | Hashimoto ............. 395/200.68 |
| 5,870,557 A | 2/1999 | Bellovin et al. ....... 395/200.54 |
| 5,914,953 A | 6/1999 | Krause et al. .............. 370/392 |
| 5,919,266 A | * 7/1999 | Sud et al. .................... 714/13 |
| 5,928,332 A | * 7/1999 | Pierce ........................ 709/242 |
| 5,963,448 A | * 10/1999 | Flood et al. ................ 364/187 |
| 6,023,507 A | * 2/2000 | Wookey ...................... 380/21 |
| 6,085,244 A | * 7/2000 | Wookey ..................... 709/224 |
| 6,118,768 A | 9/2000 | Bhatia et al. .............. 370/254 |
| 6,263,452 B1 | * 7/2001 | Jewett et al. .................. 714/9 |

OTHER PUBLICATIONS

Jack Jenney, "Dual RSP—High System Availability SW Functional Spec", Oct. 6, 1995, Cisco Systems, Inc.

* cited by examiner

*Primary Examiner*—Scott Baderman
*Assistant Examiner*—Rita A Ziemer
(74) *Attorney, Agent, or Firm*—Van Pelt & Yi LLP

(57) ABSTRACT

The present invention relates to providing processor redundancy in a system such as a router. According to an embodiment of the present invention, in a system having two or more processors, initialization sequence is started. During the initialization sequence, a redundancy subsystem is initialized. The redundancy subsystem identifies the projects or assignments that are to be off loaded from the primary processor to the secondary processor. According to an embodiment of the present invention, the initialization sequence is then suspended and a discovery process is performed. During the discovery process, it is determined whether the processor running the initialization sequence is a primary or a secondary processor. If it is a secondary processor, then the initialization sequence remains suspended and the secondary processor monitors the health of the primary processor until a failure of the primary processor occurs. If a primary processor failure occurs, then the initialization process is resumed for the secondary processor, hence establishing the secondary processor as the new primary processor.

19 Claims, 8 Drawing Sheets

SYSTEM AND METHOD FOR ESTABLISHING PROCESSOR REDUNDANCY

FIELD OF THE INVENTION

The present invention relates to computer networks. In particular, the present invention relates to establishing processor redundancy.

BACKGROUND OF THE INVENTION

A network is a communication system that allows users to access resources on other computers and exchange messages with other users. A network is typically a data communication system that links two or more computers and peripheral devices. It allows users to share resources on their own systems with other network users and to access information on centrally located systems or systems that are located at remote offices. It may provide connections to the Internet or the networks of other organizations. The network typically includes a cable that attaches to network interface cards (NIC) in each of the devices within the network. Users may interact with network-enabled software applications to make a network request (such as to get a file or print on a network printer). The application may also communicate with the network software and network software then may interact with the network hardware to transmit information to other devices attached to the network.

An example of a network is a local area network (LAN). A LAN is a network that is located in a relatively small area, such as a department or building. A LAN typically includes a shared medium to which workstations attach and communicate with one another by using broadcast methods. With broadcasting, any device on the LAN can transmit a message that all other devices on the LAN can listen to. The device to which the message is addressed actually receives the message. Data is typically packaged into frames for transmission on the LAN.

FIG. 1 is a block diagram illustrating a network connection between a user 10 and a particular web page 20. This FIG. is an example which may be consistent with any type of network, including a LAN, a wide are network (WAN), or a combination of networks, such as the Internet.

When a user 10 connects to a particular destination, such as a requested web page 20, the connection from the user 10 to the web page 20 is typically routed through several routers 12A–12D. Routers are internetworking devices. They are typically used to connect similar and heterogeneous network segments into internetworks. For example, two LANs may be connected across a dial-up, integrated services digital network (ISDN), or a leased line via routers. Routers may also be found throughout the Internet. End users may connect to a local Internet service provider (ISP) (not shown), which are typically connected via routers to regional ISPs, which are in turn typically connected via routers to national ISPs.

If a router, such as router 12C, fails and is no longer able to route the desired connection, then the desired connection between the user 10 and the desired web page 20 may be significantly delayed or unable to connect at all. To avoid this problem, a solution has been implemented by router manufacturers, such as Cisco Systems, that include two processors, a primary processor and a secondary processor, such that the secondary processor may take over as the main processor if the primary processor has either a hardware or software failure. Accordingly, such a solution provides redundancy to avoid failure of the router.

If the secondary processor is required to switch itself over to the primary processor, then the secondary processor typically reboots, establishes itself as the primary processor, and re-initializes the entire router to become the primary processor. The re-booting and re-initializing process can take a substantial amount of time, such as minutes, since software is typically reloaded from either the network or flash memory and the new primary processor needs to run through the router configuration. The router configuration typically controls how the router moves data traffic. The configuration typically controls the path of network packets on their way to their final destination. The router configuration can be highly complex. The more complex the router configuration, the longer it typically takes to configure the router. Re-booting the router may take approximately 30 seconds to 5 minutes.

Although such redundancy routers may contain two processors, the secondary processor is typically unavailable for any work which is normally assigned to the primary processor. The secondary processor typically runs an image that is separate and different from the image which is run by the primary processor. Accordingly, the secondary processor is typically unavailable for offloading any work from the primary processor.

It would be desirable for a router to provide redundancy without a substantial amount of down time for re-booting. It would also be desirable for such a router to offer an option of the secondary processor being able to off load work from the primary processor, thus making use of both processors simultaneously. The present invention addresses such needs.

SUMMARY OF THE INVENTION

The present invention relates to providing processor redundancy in a system such as a router. According to an embodiment of the present invention, in a system having two or more processors, initialization sequence is started. During the initialization sequence, a redundancy subsystem is initialized. The redundancy subsystem identifies the projects or assignments that are to be off loaded from the primary processor to the secondary processor. According to an embodiment of the present invention, the initialization sequence is then suspended and a discovery process is performed. During the discovery process, it is determined whether the processor running the initialization sequence is a primary or a secondary processor. If it is a secondary processor, then the initialization sequence remains suspended and the secondary processor monitors the health of the primary processor until a failure of the primary processor occurs. If a primary processor failure occurs, then the initialization process is resumed for the secondary processor, hence establishing the secondary processor as the new primary processor.

According to an embodiment of the present invention, if the processor running the initialization sequence is the primary processor, then the initialization process is resumed. Also according to an embodiment of the present invention, the suspension of the initialization sequence and performance of the discovery process preferably occurs prior to initialization of the driver subsystems. The remaining initialization sequence is then finished, and the system is run.

According to an embodiment of the present invention, each processor, both secondary and primary have the same image such that the same initialization sequence and suspension with the discovery process is performed in both the primary and secondary processors.

A method according to an embodiment of the present invention for establishing processor redundancy is presented. The method comprises providing a processor and suspending an initialization sequence of the processor. The method also determines whether the processor is a secondary processor; and resumes the initialization sequence if the processor is not a secondary processor.

A system according to an embodiment of the present invention for establishing processor redundancy is also presented. The system comprises a processor configured to suspend an initialization sequence of the processor. The processor is also configured to determine whether it is a secondary processor, and resumes the initialization sequence if the processor is not a secondary processor. The system also includes a memory coupled to the processor, and the memory is configured to provide instructions to the processor.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
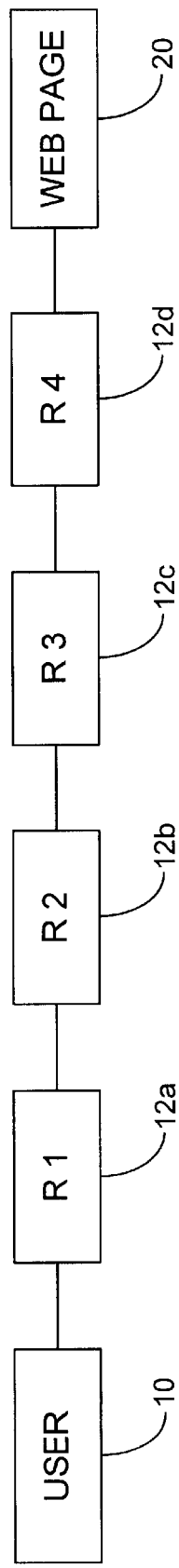
FIG. 1 is a block diagram of an example of a network connection between a user and a web page.
Figure 2:
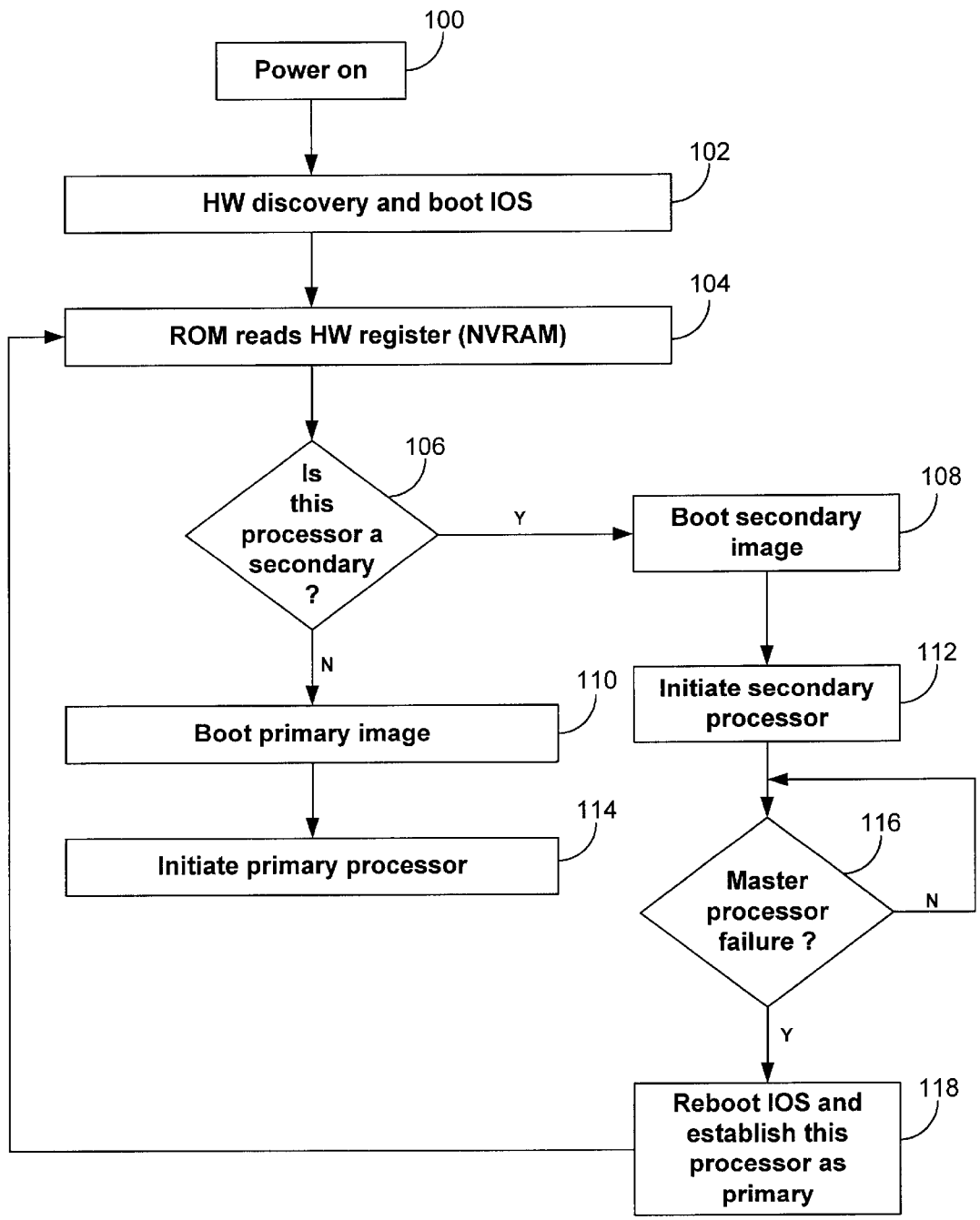
FIG. 2 is a flow diagram of a conventional method for providing redundant processors in a router.

FIG. 2 is a flow diagram of a conventional method for establishing processor redundancy in a router. When power is turned on (step 100), hardware discovery is performed as well as booting up of an operating system (such as an Internet operating system (IOS)) for the router (step 102). Memory, such as read-only-memory (ROM) then reads hardware registers, such as registers in non-volatile random access memory (NVRAM) (step 104).

It is then determined whether this processor (i.e. the processor that was powered on and is running this software) is a secondary processor (step 106). If this processor is not a secondary processor, then a primary image is booted up for this processor (primary processor) (step 110). An initialization sequence is then performed for the primary processor (step 114).

If this processor is determined to be a secondary processor (step 106), then a secondary image is booted up for the secondary processor (step 108). An initialization sequence is then performed for the secondary processor (step 112). It is then determined whether the primary processor has had a failure (step 116). The primary processor's health is monitored until it is determined that the primary processor has had a failure. Once the primary processor fails, then the Internet operating system (IOS) of the router is re-booted and this processor (formally the secondary processor) is then established as the primary processor (step 118). Thereafter, the ROM reads the hardware registers (step 104), it is determined that this processor is now a primary processor (step 106), and a primary image is then booted up (step 110).

As previously mentioned, a potential drawback with this conventional method is that if the primary fails and the secondary processor takes over the function of the primary processor, then the entire router system is typically re-booted and a primary image, different from the secondary image, is booted and a primary processor initialization sequence is performed. This process of the secondary processor taking over the functions of the primary processor may be substantially time consuming. Additionally, since the primary processor and the secondary processor each boot a different image, the secondary processor typically performs no function other than monitoring the health of the primary processor and acting as a standby processor.

It would be desirable to provide processor redundancy in a system such as a router that significantly reduces the time required for the secondary processor to take over the functions of the primary processor in case of a failure of the primary processor. It would also be desirable for the secondary processor to have the ability to perform some functions that are conventionally the duties of the primary processor. The present invention addresses such needs.

Figure 3:
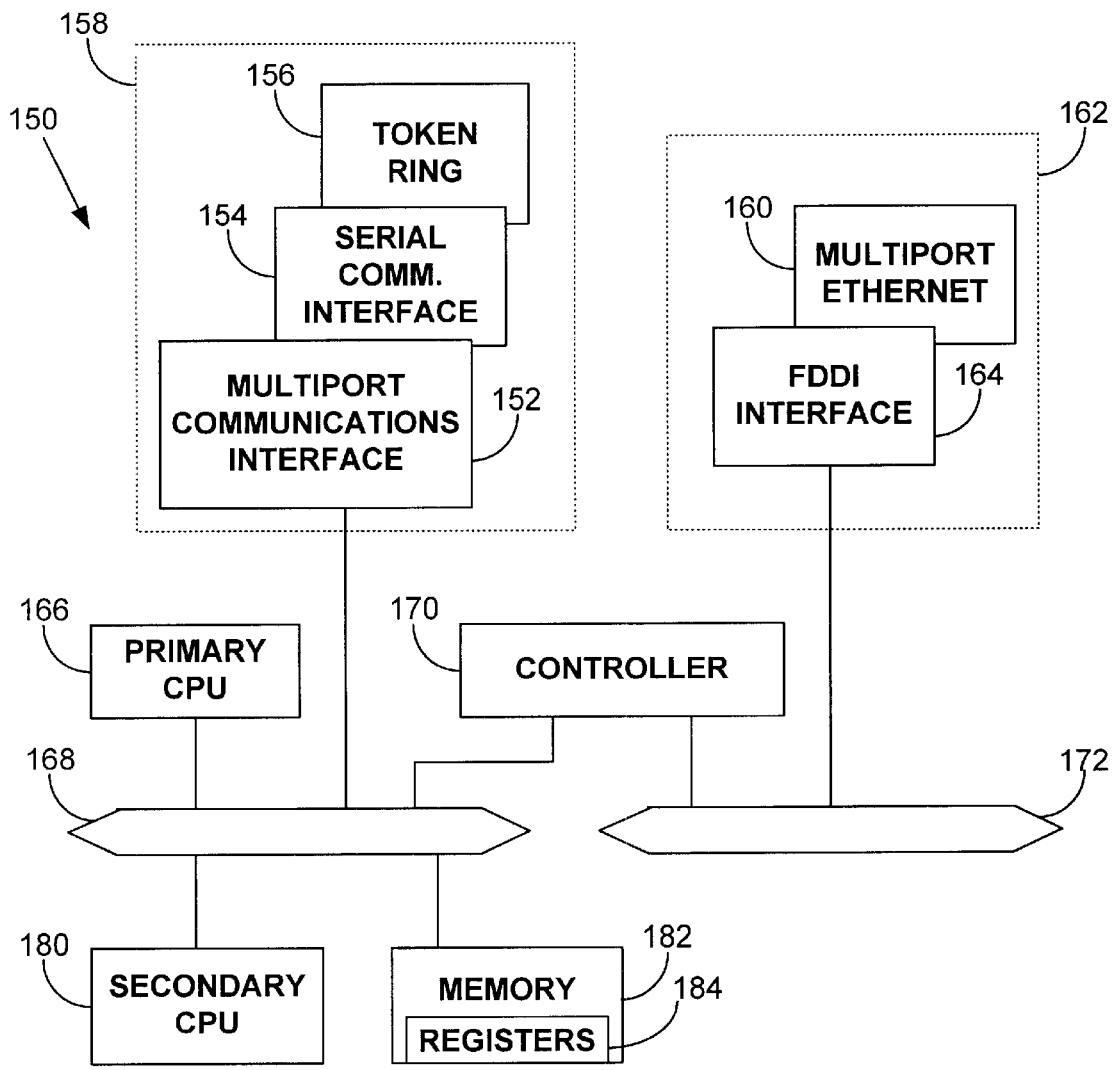
FIG. 3 is a block diagram of an example of a router suitable for implementing an embodiment of the present invention.

FIG. 3 is a block diagram of an example of a router suitable for implementing an embodiment of the present invention. The router 150 is shown to include a primary central processing unit (CPU) 166, low and medium speed interfaces 158, and high speed interfaces 162. The primary CPU 166, may be responsible for such router tasks as routing table computations and network management. It may include one or more microprocessor chips selected from complex instruction set computer (CISC) chips (such as the Motorola 68040 Microprocessor), reduced instructions set computer (RISC) chips, or other available chips. Non-volatile RAM and/or ROM may also form part of the primary CPU 166. However, there are many different ways in which memory can be coupled to the system. For example, a memory 182 may be coupled with the primary CPU 166 via a bus 168. The memory 182 may also be coupled with a secondary CPU 180 via the bus 168.

The memory 182 may include registers 184 which may be used for communication between the primary CPU 166 and the secondary CPU 180. For example, the registers 184 may indicate whether a global lock has been acquired by either the primary CPU 166 or the secondary CPU 180; indicate states of the processors 166 and 180 such as primary, secondary, non-participant, or there are no processor cards present; and indicate whether either of the processors 166 and 180 have had a failure.

The interfaces 158 and 162 are typically provided as interface cards. Generally, they control the sending and receipt of data packets over the network and sometimes support other peripherals used with the router 150. Examples of interfaces that may be included in the low and medium interfaces 158 include a multiport communications interface 152, a serial communications interface 154, and a token ring interface 156. Examples of interfaces that may be included in the high speed interfaces 162 include a fiber distributed data interface (FDDI) 164 and a multiport Ethernet interface 160. Each of these interfaces (low/medium and high speed) may include (1) a plurality of ports appropriate for communication with the appropriate media, and (2) an independent processor such as the 2901 bit slice processor (available from Advanced Micro Devices Corporation of Santa Clara, Calif.), and in some instances (3) volatile RAM. The independent processors control such communication intensive tasks as packet switching and filtering, and media control and management. By providing separate processors for the communication intensive tasks, this architecture permits the primary microprocessor 166 to efficiently perform routing computations, network diagnostics, security functions, etc.

The low and medium speed interfaces are shown to be coupled to the master CPU 166 through a data, control, and address bus 168. High speed interfaces 162 are shown to be connected to the bus 168 through a fast data, control, and address bus 172 which is in turn connected to a bus controller 170. The bus controller functions are provided by a processor such as a 2901 bit slice processor.

Although the system shown in FIG. 3 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 4:
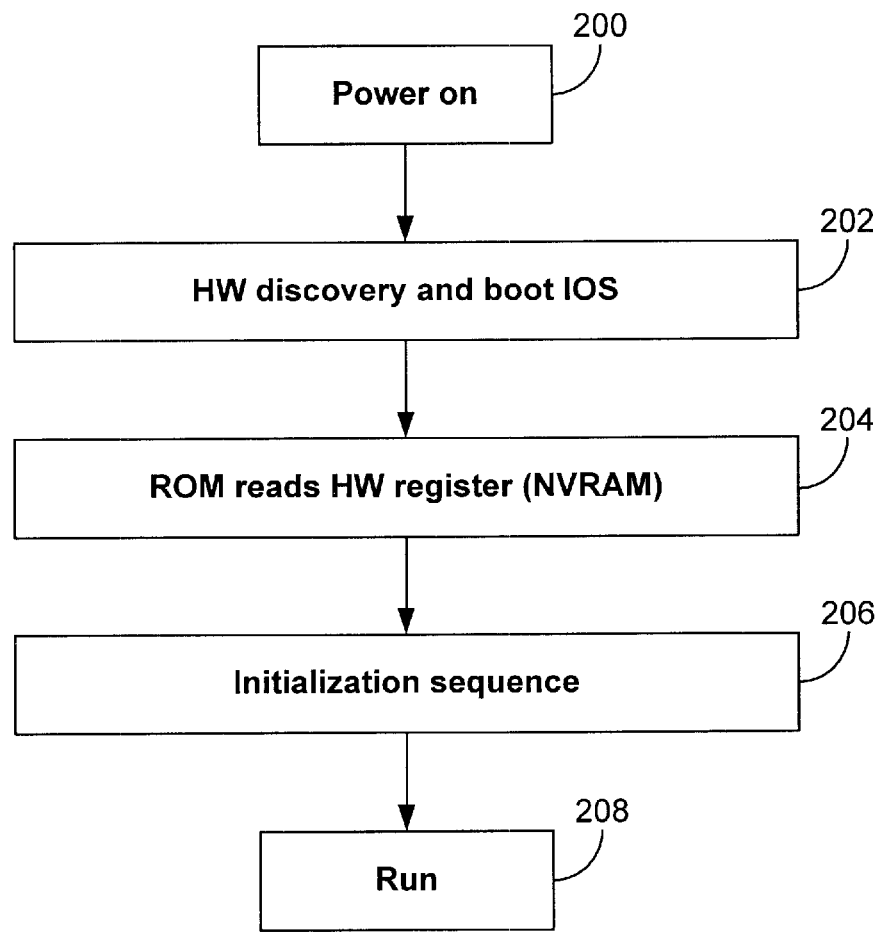
FIG. 4 is a flow diagram of a method according to an embodiment of the present invention for providing processor redundancy in a system such as a router.

FIG. 4 is a flow diagram of a method according to an embodiment of the present invention for providing processor redundancy in a system such as a router. According to an embodiment of the present invention, the method shown in FIG. 4 is performed for each processor, both primary and secondary.

When the power is turned on (step 200), hardware discovery is performed and the Internet operating system of the router is booted up (step 202). Memory, such as a read-only memory, then reads hardware registers, which may be located in memory such as non-volatile random access memory (NVRAM) (step 204). Initialization sequence of the processor is then performed (step 206), and the router system is then run (step 208).

Figure 5:
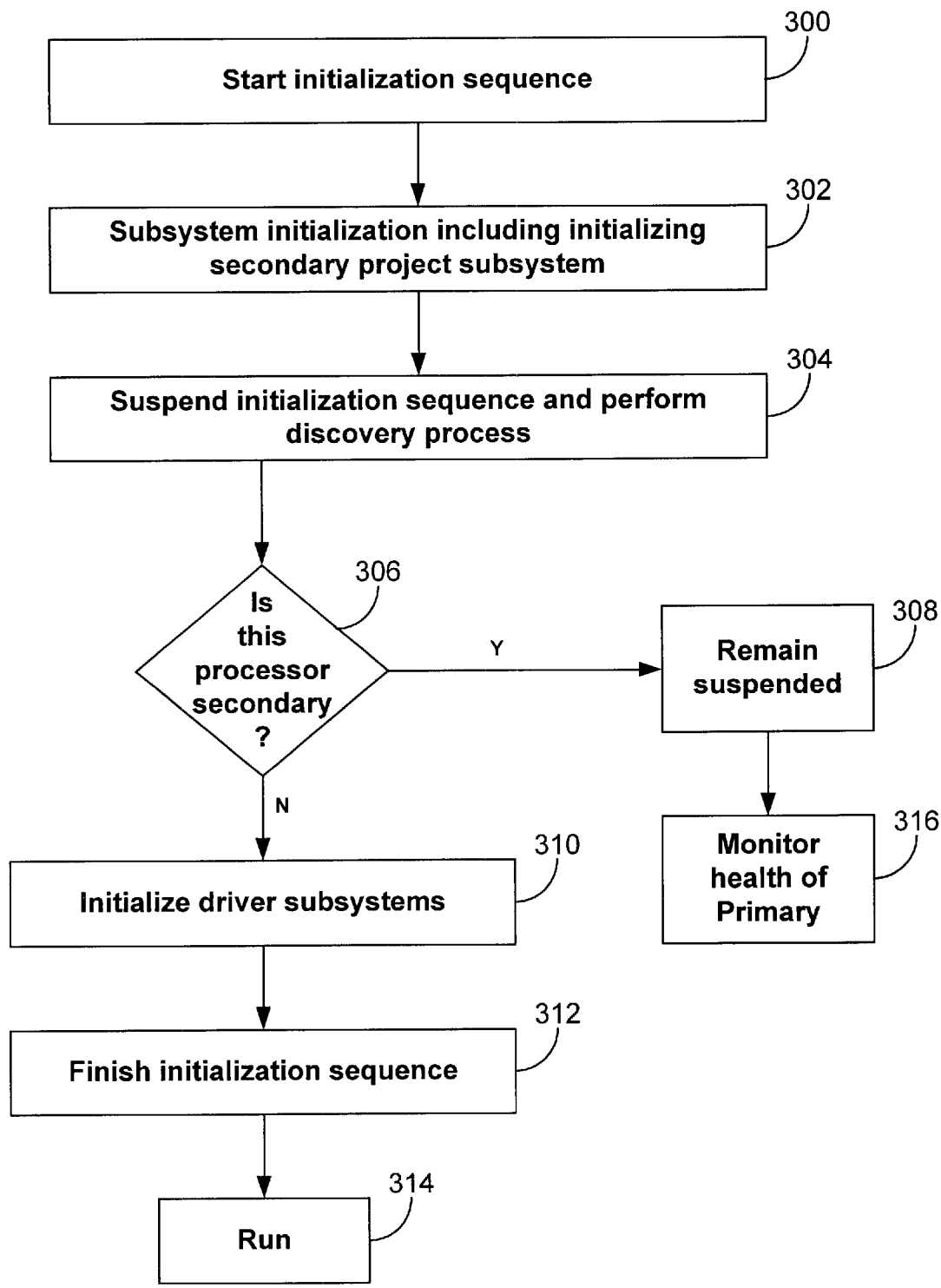
FIG. 5 is a flow diagram of a method according to an embodiment of the present invention for initializing a processor in a redundant system.

FIG. 5 is a flow diagram of a method according to an embodiment of the present invention for performing an initialization sequence such as the initialization sequence of step 206 shown in FIG. 4. Initialization sequence is started (step 300). As part of the initialization sequence, subsystems are also initialized, including a redundancy subsystem (step 302). There may be several items initialized between the start of the initialization sequence and the subsystem initialization. For example, items included in the initialization sequence may include the system clock, platform hardware interrupt, CPU type and CPU family discovery, checksum for text segment, memory list manager, memory manager, platform exception handler, and console initialization. These initialization items and their sequence are well known to those of average skill in the art.

Examples of events occurring during the subsystem initialization include finding all subsystems, searching for subsystems, enabling interrupts, starting the scheduler, and initiating several items such as a kernel subsystem, generic network support services, generic system services, system logger, platform console lines and auxiliary lines, platform interfaces, platform specific memory, platform hardware, and communication support. These subsystem initialization functions are also well known to those of average skill in the art, According to an embodiment of the present invention, the subsystem initialization also includes initializing a redundancy subsystem. The redundancy subsystem may be a list of projects or functions that are to be assigned to and performed by the secondary processor. These functions and projects may include functions and projects typically performed by the primary processor. The software designer may determine which functions are to be performed by the secondary processor rather than the primary processor. These functions are listed in the redundancy subsystem. Preferably, the redundancy subsystem should be initialized prior to initialization of the driver subsystems since the initialization sequence for the secondary processor is suspended prior to the initialization of the driver subsystems according to an embodiment of the present invention. Accordingly, any function that is to be off-loaded to the secondary processor should be assigned prior to the suspension of the initialization sequence for the secondary processor.

Initialization sequence is then suspended for both primary and secondary processors and a discovery process is performed (step 304). One of the primary purposes of the discovery process is to determine whether the processor running this initialization sequence is a primary processor or a secondary processor. Further details of the discovery process will later be discussed in conjunction with FIG. 6.

It is then determined whether this processor is a secondary processor (step 306). If it is a secondary processor, the initialization sequence remains suspended (step 308). The secondary processor then monitors the health of the primary processor (step 316).

If it is determined that this processor is not a secondary processor (step 306), then driver subsystems are initialized (step 310). Thereafter, the remainder of the initialization sequence is completed (step 312), and the router system is run (step 314). Examples of the remainder of the initialization sequence includes initializing the protocol subsystems, library subsystems, management subsystems, print hardware configuration on the console, reading stored configuration, executing configuration, and ending the initialization process.

Figure 6:
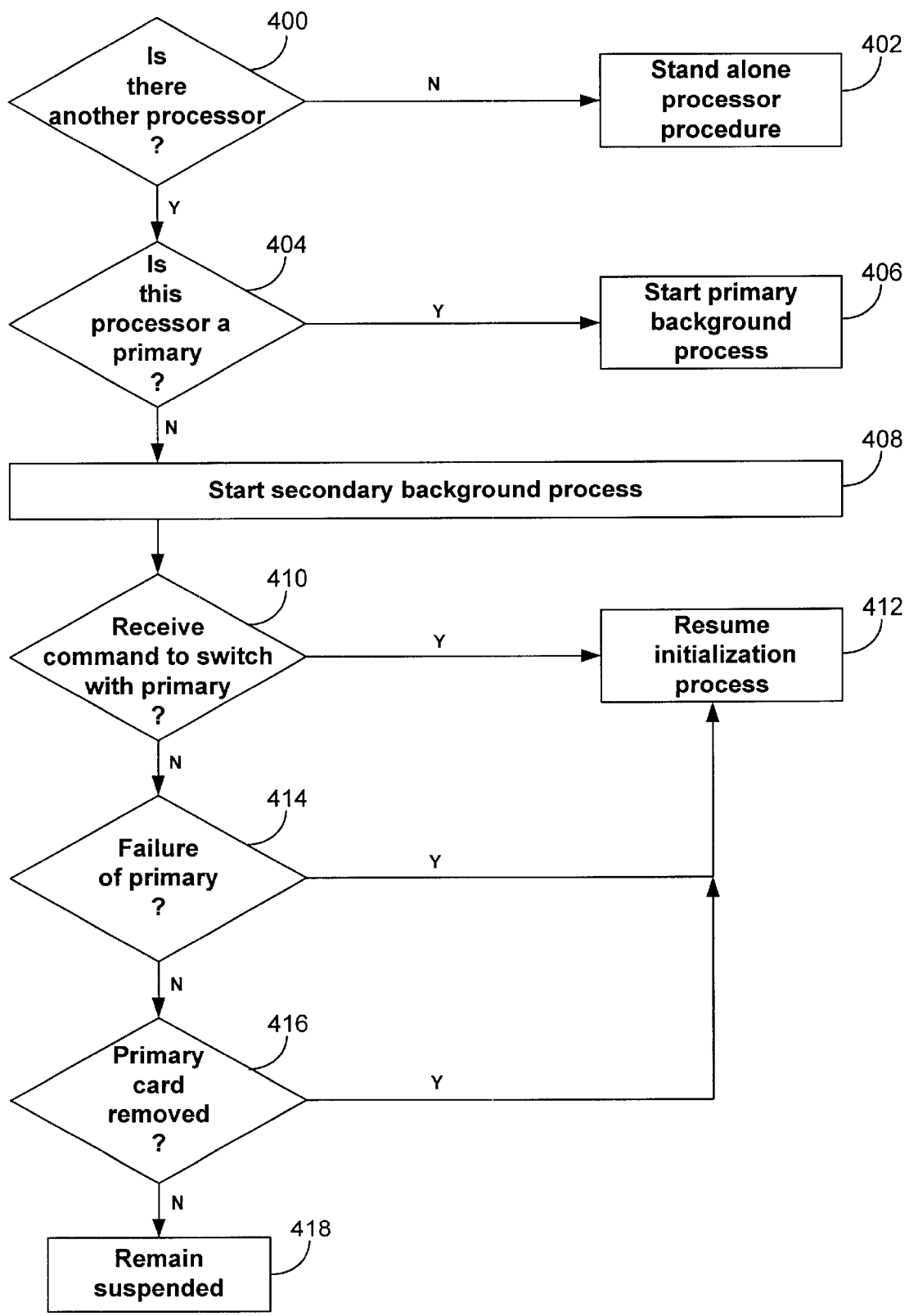
FIG. 6 is a flow diagram of a method according to an embodiment of the present invention for performing a discovery process.

FIG. 6 is a flow diagram of a method according to an embodiment of the present invention for performing a discovery process such as the discovery process of step 304 of FIG. 5. It is determined whether there is another processor other than the one executing this method (step 400). If there is no other processor, then the processor acts as a stand alone processor (step 402). A stand alone processor procedure may simply be a conventional router with a single processor. If, however, there is another processor, then it is determined whether this processor is a primary processor (step 404). One example of how this processor may be determined to be a primary processor is by reading one of the registers in the memory, such as register 184 of FIG. 3. If this processor is a primary processor, then a primary background process is initiated (step 406). Further details of the primary background process will later be discussed in conjunction with FIG. 7.

If, however, this processor is not a primary processor (step 404), then a secondary background process is initiated (step 406). Details of the secondary background process will later be discussed in conjunction with FIG. 8.

It is then determined whether the secondary processor receives a command to switch with the primary processor (step 410). The command to switch with the primary processor may be initiated by a user or designed into the program under certain conditions by the designer. If the command to switch with the primary processor is received, then initialization process is resumed for the secondary processor (step 412). Thereafter, step 306 of FIG. 5 may be executed.

If, however, a command to switch with the primary processor is not received, then it is determined whether the primary processor has failed (step 414). Examples of the failure of the primary processor include either a hardware failure or a software failure. If the primary processor has failed, then the initialization process is resumed for the secondary processor (step 412), and step 306 of FIG. 5 is then executed.

If the primary processor has not failed, then it is determined whether the primary processor card has been removed (step 416). If the primary processor has been removed, then the initialization process of this processor is resumed (step 412), and step 306 of FIG. 5 is then executed.

If the primary processor card has not been removed (step 416), then the initialization sequence remains suspended for the secondary processor (step 418). A command to switch with the primary processor, the failure of the primary processor, and the removal of the primary processor card are merely examples of events that may trigger the secondary processor taking over the functions of the primary processor. Other events may be used as a trigger for the secondary processor to take over the functions of the primary processor. Accordingly, if there is no event triggering the secondary processor taking over the functions of the primary processor, then the initialization sequence of the secondary processor remains suspended indefinitely. However, if an event triggers the taking over of the primary processor functions by the secondary processor at any time while the router is functioning, the initialization process of the secondary processor is resumed and the secondary processor automatically functions as the primary processor without the need to re-boot the system.

Figure 7:
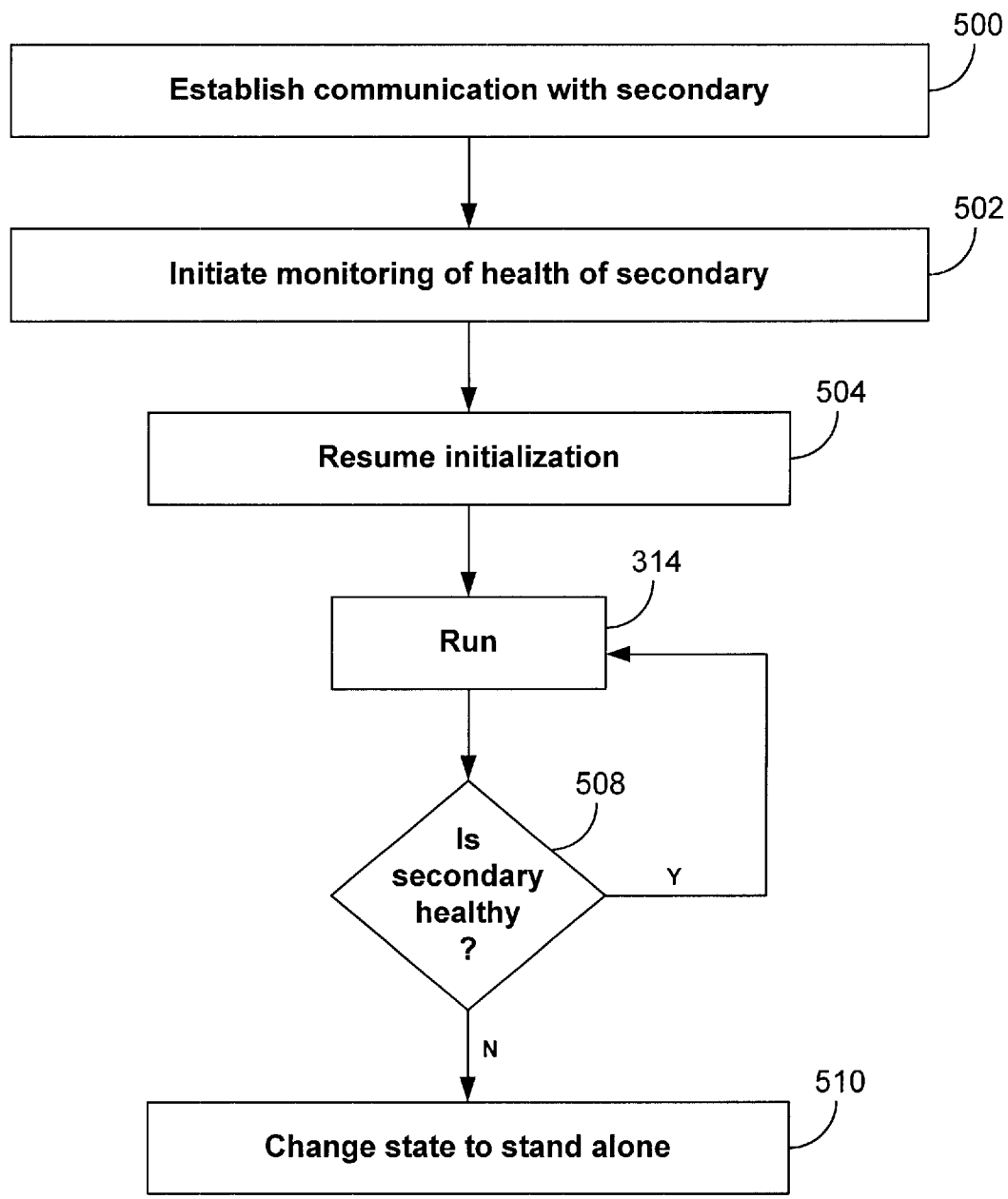
FIG. 7 is a flow diagram of a method according to an embodiment of the present invention for running a primary processor background.

FIG. 7 is a flow diagram of a method according to an embodiment of the present invention for performing a primary background process, such as that described in step 406 of FIG. 6. The primary background process is performed for the primary processor. The primary processor establishes communication with the secondary processor (step 500). The primary processor also initiates the monitoring of the health of the secondary processor (step 502). The initialization sequence is then resumed (step 504), and the operating system of the primary processor is run (step 314). The resumption of the initialization sequence (step 504) and running of the system (step 314) are equivalent to steps 310–314 of FIG. 5.

The primary processor then continually checks the health of the secondary processor (step 508). If the health of the secondary processor fails, then the state of the primary processor changes to a stand alone processor (step 510). According to an embodiment of the present invention, a processor may have multiple states, examples of these states include stand alone, primary, and secondary.

Figure 8:
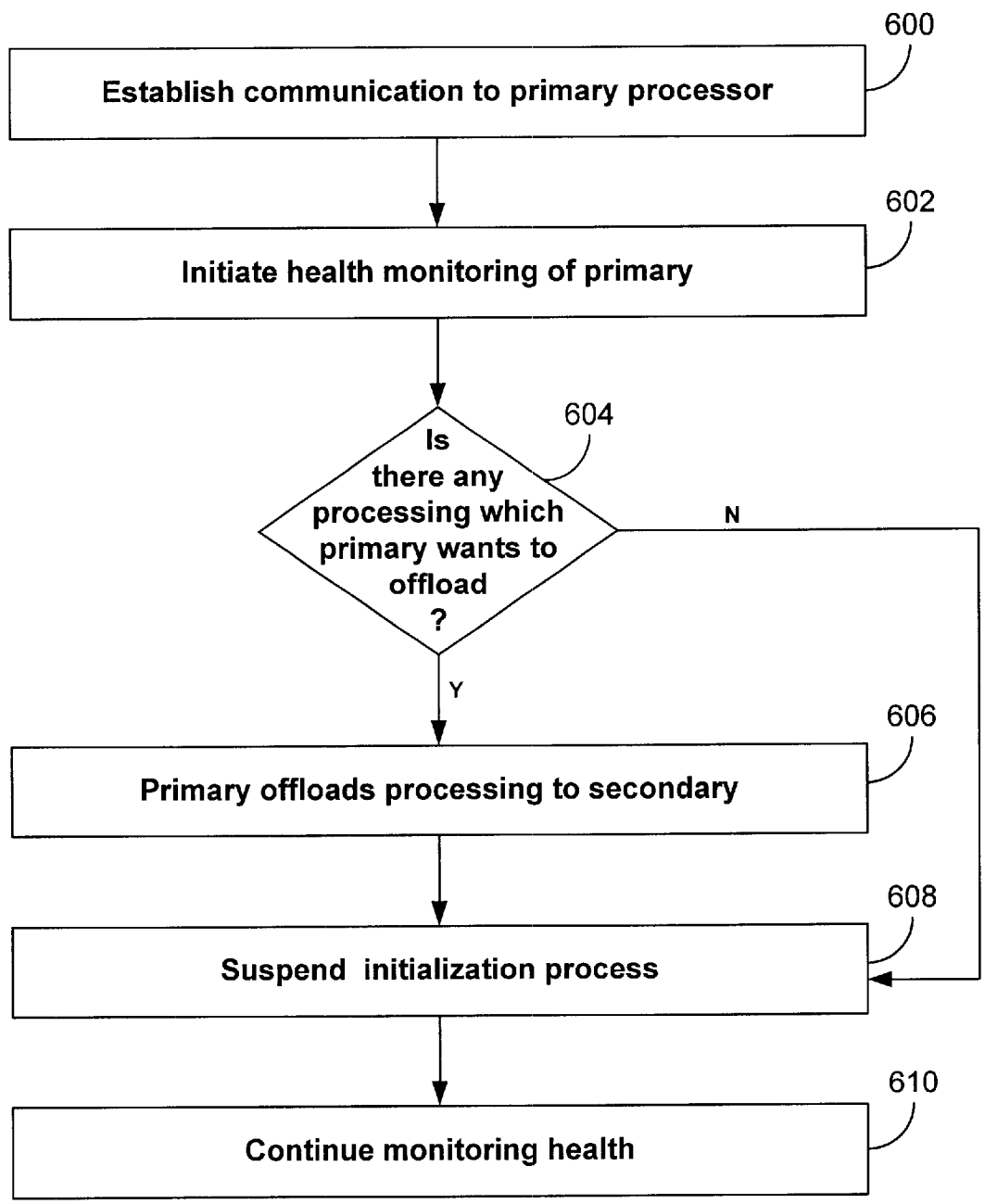
FIG. 8 is a flow diagram of a method according to an embodiment of the present invention for running a secondary processor background.

FIG. 8 is a flow diagram of a method according to an embodiment of the present invention for performing a secondary background process, such as that described in step 408 of FIG. 6. The secondary background process is run by the secondary processor. An example of the way the health of the other processor is monitored is through the use of registers in memory, such as registers 184 of FIG. 3. One of the registers may indicate whether the primary processor has had a failure, while another register indicates whether the secondary processor has had a failure.

The secondary processor establishes communication with the primary processor (step 600). Health monitoring of the primary processor is then initiated (step 602). It is then determined whether there is any processing which the primary processor is off loading to the secondary processor (step 604). This determination may be made by reviewing the list in the redundancy subsystem of step 302 of FIG. 5. As previously mentioned, the list of functions in the redundancy subsystem may be created by the software developer and should be initialized prior to the suspension of the initialization sequence which preferably occurs prior to initializing the driver subsystems. If there is processing that the primary processor is off loading to the secondary processor, then these functions listed in the redundancy subsystem are off loaded to the secondary processor (step 606).

The initialization sequence then remains suspended (step 608), however, anything that was off-loaded from the primary processor to the secondary processor is run by the secondary processor. If there is no processing to be off-loaded from the primary processor to the secondary processor, then the initialization sequence also remains suspended (step 608). Thereafter, the secondary processor continues to monitor the health of the primary processor (step 610), and step 410 of FIG. 6 is executed.

A method and system for establishing processor redundancy in a system such as a router has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed:

1. A method for establishing router redundancy, comprising:
    providing a router processor;
    suspending an initialization sequence of the router processor;
    determining whether the router processor is a secondary processor;
    resuming the initialization sequence if the router processor is not a secondary processor; and
    continuing to suspend the initialization sequence of the router processor if the router processor is a secondary processor, whereby the router processor remains in a partially initialized state such that it would be ready to resume and complete the previously suspended initialization process in the event it were to become necessary for the router processor to become a primary processor.

2. The method of claim 1, further comprising monitoring a health of the secondary processor if the router processor is not the secondary processor.

3. The method of claim 1, further comprising monitoring a health of a primary processor if the router processor is the secondary processor.

4. The method of claim 1, further comprising resuming the initialization sequence if a predetermined event occurs and if the router processor is the secondary processor.

5. The method of claim 4, wherein the predetermined event includes a failure of a primary processor.

6. The method of claim 4, wherein the predetermined event includes a removal of a primary processor card.

7. The method of claim 4, wherein the predetermined event includes receiving a command to switch functions with a primary processor.

8. The method of claim 1, wherein the initialization sequence includes initializing a redundancy subsystem.

9. The method of claim 8, wherein the initializing the redundancy subsystem occurs prior to suspending the initialization sequence of the router processor.

10. The method of claim 1, wherein the secondary processor may perform processing that is off-loaded by a primary processor.

11. A system for establishing router processor redundancy, comprising:
    a router processor configured to suspend an initialization sequence of the router processor, the router processor also being configured to:
    determine whether it is a secondary processor, resume the initialization sequence if the router processor is not a secondary processor; and
    continue to suspend the initialization sequence of the router processor if the router processor is a secondary processor;
    whereby the router processor remains in a partially initialized state such that it would be ready to resume and complete the previously suspended initialization process in the event it were to become necessary for the router processor to become a primary processor; and
    a memory coupled to the router processor, the memory being configured to provide instructions to the router processor.

12. The system of claim 11, further comprising monitoring a health of the secondary processor if the router processor is not the secondary processor.

13. The system of claim 11, further comprising monitoring a health of a primary processor if the router processor is the secondary processor.

14. The system of claim 11, further comprising resuming the initialization sequence if a predetermined event occurs and if the router processor is the secondary processor.

15. The system of claim 14, wherein the predetermined event includes a failure of a primary processor.

16. The system of claim 11, wherein the secondary processor may perform processing that is off-loaded by a primary processor.

17. The system of claim 11, further comprising a second router processor configured to suspend an initialization sequence of the second router processor, the second router processor also being configured to determine whether it is a secondary processor, and resuming the initialization sequence if the second router processor is not a secondary processor.

18. A computer program product for establishing processor redundancy, comprising:
    computer code suspending an initialization sequence of a router processor;
    computer code determining whether the router processor is a secondary processor;
    computer code resuming the initialization sequence if the router processor is not a secondary processor;
    computer code continuing to suspend the initialization sequence of the router processor if the router processor is a secondary processor, whereby the router processor remains in a partially initialized state such that it would be ready to resume and complete the previously suspended initialization process in the event it were to become necessary for the router processor to become a primary processor; and
    a computer readable medium that stores the computer codes.

19. The computer program product of claim 18, wherein the computer readable medium is selected from the group consisting of CD-ROM, floppy disk, tape, flash memory, system memory, hard drive, and data signal embodied in a carrier wave.

* * * * *